UNITED STATES PATENT OFFICE.

CHARLES A. DOREMUS, OF NEW YORK, N. Y., ASSIGNOR OF ONE-HALF TO JOHN SHERMAN HOYT, OF DARIEN, CONNECTICUT.

PROCESS FOR PRODUCING ALUMINIUM HYDRATE.

1,215,351.     Specification of Letters Patent.     Patented Feb. 13, 1917.

No Drawing.     Application filed February 27, 1914.   Serial No. 821,564.

*To all whom it may concern:*

Be it known that I, CHARLES A. DOREMUS, a citizen of the United States, and a resident of New York, county of New York, and State of New York, have invented certain new and useful Improvements in Processes for Producing Aluminium Hydrate, of which the following is a specification.

My invention relates to the manufacture of aluminium hydrate from aluminium fluorid.

Several processes are now known for obtaining aluminium fluorid in a cheap and simple manner, for instance, the process described in my copending application Serial No. 749,806, filed February 21st, 1913. However, much difficulty has been experienced in obtaining a process for decomposing it in a simple, cheap and efficient manner, to obtain valuable products, since aluminium fluorid offers difficulties when acted on by chemical reagents which decompose other aluminous salts with ease. Thus when either solid aluminium fluorid or its solution is treated with sulfuric acid a complete decomposition only results after several evaporations, and the use of an excess of acid. The fluorid also has a tendency to form complex salts.

In carrying out my invention, I treat a solution of aluminium fluorid with an alkali, such as sodium hydrate or calcium hydrate, to produce a precipitate of a fluorid of the alkali or alkaline earth metal, such as sodium fluorid or calcium fluorid. Aluminium hydrate is formed at the same time. Sodium hydrate is now added in sufficient quantity to unite with the precipitated aluminium hydrate to form a solution of sodium aluminate, with perhaps a slight excess of alkali, then the sodium or calcium fluorid first produced is easily separated either by filtration or sedimentation. The cold dilute solution of sodium aluminate is then preferably agitated to gradually precipitate aluminium hydrate, which increases until about 75% of the aluminium present in the sodium aluminate separates in the form of hydrate. This precipitate is then separated from the liquor by filtration and washed, and is suitable for the preparation of aluminium or aluminous products.

The recovered alkaline liquor may be used as a solvent for more aluminium hydrate precipitated, as above described.

As an example of my method of treatment I take hydro-fluoric acid of 16% strength, and add sufficient kaolin, calcined if necessary, to neutralize the acid and precipitate silica and produce aluminium fluorid in solution. The solution of aluminium fluorid is separated from the silica by filtration. Or the aluminium fluorid may be produced as described in my said copending application Serial No. 749,806. After oxidizing any iron present in the aluminium fluorid solution in a ferrous state to ferric state, as by adding a little chlorin or peroxid of hydrogen or other oxidizing agent, I add, while stirring, enough sodium or calcium hydrate to combine with the fluorin in the solution to form sodium or calcium fluorid, as the case may be. Aluminium hydrate is simultaneously formed, and both are precipitated along with the iron. Sodium hydrate is next added until the aluminium hydrate has dissolved, forming a solution of sodium aluminate having about 60 grams of $Na_2O$ and 60 grams of $Al_2O_3$ per liter in it. This solution is separated from the precipitated fluorid of sodium or calcium and iron by sedimentation or filtration. The precipitate is washed with as little water as possible. The filtrate is next agitated or stirred for some hours while cold, and aluminium hydrate is precipitated which is separated from the liquor by filtration. This hydrate is also washed to remove adherent alkali.

If the precipitate of sodium or calcium fluorid contains iron I wash it with dilute hydrofluoric acid, thus dissolving out the iron, and follow the acid by water or dilute alkali.

The ferruginous precipitate readily parts with the iron when acted on by dilute hydrofluoric acid. The residual fluorid after washing may then be treated, if need be, with alkali to render it neutral.

The sodium aluminate solution instead of being stirred to precipitate the aluminium hydrate may be treated with carbon dioxid gas to decompose it and the aluminium hydrate precipitated, which by filtration and washing may be separated from the solution of sodium carbonate simultaneously produced. The sodium carbonate solution may then be causticized by lime, but this alternative method of securing the aluminium hydrate is not as direct and advantageous as the stirring.

What I claim and desire to secure by Letters Patent is:

1. The process of producing aluminium hydrate from aluminium fluorid, which consists in treating a solution of aluminium fluorid with alkali to precipitate aluminium hydrate and a fluorid, then adding sodium hydrate to form sodium aluminate in solution, separating this from the fluorid precipitate, then treating the solution of sodium aluminate to precipitate aluminium hydrate, and separating the aluminium hydrate from the alkaline solution.

2. The process of producing aluminium hydrate from aluminium fluorid, which consists in treating a solution of aluminium fluorid with calcium hydrate to precipitate aluminium hydrate and a fluorid, then adding sodium hydrate to form sodium aluminate in solution, separating this from the fluorid precipitate, then treating the solution of sodium aluminate to precipitate aluminium hydrate, and separating the aluminium hydrate from the alkaline solution.

3. The process of producing aluminium hydrate from aluminium fluorid, which consists in oxidizing any iron in a solution of aluminium fluorid, treating the solution with alkali to precipitate aluminium hydrate and a fluorid, then separating the aluminium hydrate from the fluorid to produce an iron free aluminium hydrate.

4. The process of producing aluminium hydrate from aluminium fluorid, which consists in oxidizing any iron in a solution of aluminium fluorid, treating the solution with alkali to precipitate aluminium hydrate and a fluorid, then adding sodium hydrate to form sodium aluminate in solution, separating this from the fluorid precipitate, then treating the solution of sodium aluminate to precipitate aluminium hydrate, and separating the aluminium hydrate from the alkaline solution.

5. The process of producing aluminium hydrate from aluminium fluorid, which consists in oxidizing any iron in a solution of aluminium fluorid, treating the solution with alkali to precipitate aluminium hydrate and a fluorid, then adding sodium hydrate to form sodium aluminate in solution, separating this from the fluorid precipitate, then treating the solution of sodium aluminate to precipitate aluminium hydrate, and separating the aluminium hydrate from the alkaline solution.

In testimony whereof, I have signed my name to this specification, in the presence of two subscribing witnesses.

CHARLES A. DOREMUS.

Witnesses:
JOHN O. GEMPLER,
EDWIN SEGER.